(12) United States Patent
Furtner et al.

(10) Patent No.: US 8,099,469 B2
(45) Date of Patent: Jan. 17, 2012

(54) MASTER NODES AND SLAVE NODES FOR A COMMUNICATION NETWORK, AND METHODS THEREOF

(75) Inventors: Wolfgang Furtner, Fuerstenfeldbruck (DE); Stephan Kronseder, Greiling (DE); Debin Li, Xi'an (CN); Jason Sen Qian, Mississauga (CA)

(73) Assignee: Infineon Technologies AG, Neubiberg (DE)

( * ) Notice: Subject to any disclaimer, the term of this patent is extended or adjusted under 35 U.S.C. 154(b) by 9 days.

(21) Appl. No.: 12/626,539

(22) Filed: Nov. 25, 2009

(65) Prior Publication Data

US 2010/0131610 A1    May 27, 2010

(30) Foreign Application Priority Data

Nov. 27, 2008 (DE) .......................... 10 2008 059 204

(51) Int. Cl.
G06F 15/16 (2006.01)
(52) U.S. Cl. ........................ 709/208; 709/209
(58) Field of Classification Search .................. 709/208, 709/209
See application file for complete search history.

(56) References Cited

U.S. PATENT DOCUMENTS

| | | | |
|---|---|---|---|
| 4,730,251 A | 3/1988 | Aakre et al. | |
| 5,761,697 A | 6/1998 | Curry et al. | |
| 6,724,297 B1 * | 4/2004 | Vacherand et al. | 340/10.3 |
| 6,988,667 B2 * | 1/2006 | Stewart et al. | 235/492 |
| 7,099,970 B1 * | 8/2006 | Foegelle et al. | 710/110 |
| 7,181,557 B1 * | 2/2007 | Falik et al. | 710/110 |
| 7,262,686 B2 * | 8/2007 | Stewart et al. | 340/10.41 |
| 2003/0004938 A1 * | 1/2003 | Lawder | 707/3 |
| 2003/0019929 A1 * | 1/2003 | Stewart et al. | 235/385 |
| 2003/0126113 A1 * | 7/2003 | Brown | 707/1 |
| 2005/0211787 A1 * | 9/2005 | Stewart et al. | 235/492 |
| 2005/0259609 A1 | 11/2005 | Hansquini et al. | |
| 2007/0262851 A1 * | 11/2007 | Stewart et al. | 340/10.41 |
| 2009/0307214 A1 * | 12/2009 | Yoshida | 707/5 |
| 2010/0049870 A1 * | 2/2010 | Brown et al. | 709/242 |

FOREIGN PATENT DOCUMENTS

EP    0406718    1/1994

OTHER PUBLICATIONS

Maxim, Application Note 187, dated Mar. 28, 2002, retrieved from <http://www.maxim-ic.com/an187>, 18 pages.

* cited by examiner

*Primary Examiner* — Tammy Thanh Nguyen
*Assistant Examiner* — Jonathan Bui
(74) *Attorney, Agent, or Firm* — Banner & Witcoff, Ltd.

(57) ABSTRACT

Illustrative methods, apparatuses and software are described for searching for an ID of a slave node within a communication network, such as a single-wire communication network. Also, illustrative embodiments of a master node and a slave node are described.

14 Claims, 7 Drawing Sheets

MASTER NODES AND SLAVE NODES FOR A COMMUNICATION NETWORK, AND METHODS THEREOF

CROSS-REFERENCE TO RELATED APPLICATIONS

This application claims priority under 35 U.S.C. §119 to German Patent Application No. 102008059204.8, which was filed on Nov. 27, 2008, and which is hereby incorporated by reference as to its entirety.

BACKGROUND

In accordance with the various requirements placed upon bandwidth, complexity and cost, various communication systems have formed so as to meet said various requirements.

Single-wire communication networks comprising single wire interfaces (SWI) have become established in the market for not very complex applications, wherein a small number of terminal contacts is desired. Single-wire communication networks support connection to a multitude of slave nodes. In this context, the automotive industry constitutes an important field of application. For example, in automobiles, several simple actuators or sensors are controlled as slave nodes in a hierarchic single-wire communication network by a shared master node.

The master node and the slave nodes are connected to the single-wire connection, or the single wire bus system. New slave nodes may be added to such a single-wire communication network at any time, and connected slave nodes may be removed, or they may temporarily fail or fail for good and possibly be replaced. Each of said slave nodes comprises a memory or other computer-readable medium (e.g., magnetic drive, optical drive, etc.) which have an identifier stored therein by means of which the respective slave node may be identified. The identifier of each node or device is unique, e.g. throughout the world, and is therefore also referred to as a unique ID (identifier). Therefore, the master node is faced with the task of communicating with the individual slave nodes to find out which slave nodes are connected to the single-wire communication network, as well as their IDs, so as to then be able to selectively communicate with them, for example, by means of their unique IDs.

A known search algorithm will be described below, with reference to FIG. 6, which employs a binary search and which is used for determining an ID or an address of a slave node. This binary search algorithm is based on the list of commands briefly explained below:

---

DISS: starting the search ID algorithm;
DIS0: device ID search "0";
DIS1: device ID search "1";
idptr: pointer to an internal ID bit position;
active: device status, which may be "True", i.e. the device is active, or "False", i.e. the device is deactivated and does not respond to further probes, or search requests, DIS0 or DSI1;
uid[x]: array that holds the ID bit stream, "x" indicating the selection of the desired bit.
Assert_IRQ: slave device responds with an interrupt signal IRQ (also referred to as "Interrupt");
Sense_IRQ: when a master node, also referred to as a "HOST", receives an interrupt signal IRQ from a slave device.

The corresponding search algorithm executed by a slave node or slave device is as follows:

---

IF command=DISS
   idptr=N
   active=True
ELSIF command=DIS0 AND active=True
   if uid [idptr−−]=0
     Assert_IRQ
ELSIF Sense_IRQ
   active_False
ELSIF command=DIS1 AND active=True
   if uid [idptr−−]=1
     Assert_IRQ
ELSIF Sense_IRQ
   active=False

---

In other words, when the slave node receives the command DISS for starting the search, it sets its pointer idptr to the value of N, N designating the number of bits of the ID, e.g. in FIG. 6: N=4, and it enters the active status. When the slave nodes receives the command DIS0 and is in an active status, it decrements the pointer idptr and compares the value stored in its array at the position of the pointer with the value of "0" and transmits an interrupt signal IRQ if this value is equal to the value of "0". If the value is not the same, the slave node will enter the inactive status. The slave node proceeds in an analog manner when it receives the command DIS1 and is in an active status. In this case, it will decrement the pointer idptr and compare the value of the array defined by the pointer with the value of "1", and output an interrupt signal IRQ if the value is equal to the value of "1". Otherwise the slave node proceeds to the inactive state.

By way of example, FIG. 6 shows the sequence of search commands DIS0 and/or DIS1 until a master node finds the addresses "0010" and "0110" (B=binary ID). During this binary search, the master node goes through the binary tree branch by branch in order to find the corresponding ID or address of the slave node. In this context, the master node proceeds in such a manner, for example, that it initially searches for the address "0000", then for the address "0001", then for the address "0010", etc. The master node proceeds position by position, probes, in a first iteration, whether a slave node has the value of "0" at the highest digit, or position, (idptr=3), only this is the case in FIG. 6, i.e. the two slave nodes respond to the first DIS0 with an interrupt, or confirmation, signal IRQ. Subsequently, the master node transmits a second DIS0, to which only the slave node having the ID "0010" responds with the interrupt signal IRQ. Since the second slave node having the address "0110" has a value of "1" at this position, it will deactivate itself and will no longer respond to any of the following search commands of the master node until it is reactivated by the master. The master node now transmits its third DIS0. Since the slave node having the address "0010" has a "1" rather than a "0" at the position UID[1], said slave node will also deactivate itself. Thus, the master node receives no interrupt signal IRQ and thus knows that there is no slave node which has the address "000x", x being a place holder for one of the two binary values "0" and "1".

With this, the first search run is completed, and the master node starts a new search run by transmitting the search start command DISS, so that all of the slave nodes will reinitialize themselves, i.e. they will set their internal counters to the value of N=4 and enter the active status. In said second search run, the same command and/or signal exchange as in the first run repeats itself for the first two positions UID[3] and UID[2]. As the third search command, the master node now transmits a DIS1 however, obtains an interrupt signal from the slave node having the address "0010", said slave node remaining active, at the same time, for continuing the search on this branch or path. As the fourth search signal in this search run, the master node then transmits a DIS0, obtains an interrupt signal from the slave node having the address "0010", and now that the ID only has four digits, the master node knows that the search has been completed successfully and that a slave node having the address, or ID, "0010", is connected to the single-wire communication network. The master node proceeds in an analogous manner for all of the other potential IDs until it has found all of the slave nodes.

This approach results in that the binary search will take a very long time if the IDs comprise a large number of bits. When it is assumed that N is the number of ID bits, then the master node may utilize $2^N$ runs if it goes through each branch of the corresponding binary tree having the length N. For example, if N=96 bits, the master node will go through up to 79,228,162,514,264,337,593,543,950,336 branches to find all of the slave nodes which are connected to the single wire line. However, typically, less search runs may be used since only a small number of slave nodes are connected to the single-wire communication network and, thus, over the search, entire sub-trees having no slave node therein need not be considered.

SUMMARY

Various aspects, including those embodied as methods, apparatuses, systems, and software instructions, are described herein. For example, a method is described that comprises defining a position of an ID or partial ID by means of an index in a master node and a slave node, the master and slave nodes being coupled together within a communication network, each slave node comprising a memory or other computer-readable medium having a multi-digit ID stored therein which enables unambiguous identification of the slave node within the communication network, each digit of the multi-digit ID exhibiting a predetermined value; transmitting a first probe command from the master node to the slave node, the first probe command defining, at that position of the ID or partial ID that is defined by the index, a first value "0" to be probed; comparing the first value "0" to be probed with a value at that position of a dedicated ID or partial ID that is defined by the index, in the slave node; transmitting an interrupt signal from the slave node responsive to the comparison resulting in that the first value "0" to be probed equals the value at that position of the dedicated ID or partial ID that is defined by the index, and that the slave node comprises an active status; transmitting an enter command from the master node to the slave node if the master node receives the interrupt signal, the enter command defining, at that position of the ID or partial ID which is defined by the index, a value "0" to be entered; comparing the value "0" to be entered with a value at that position of the dedicated ID or partial ID which is defined by the index, in the slave node; changing a dedicated status of the slave node from the active status to an inactive status responsive to the comparison resulting in that the value "0" to be entered does not equal the value at that position of the dedicated ID or partial ID that is defined by the index; and changing the index by one position in a search direction in the master node and the slave node, responsive to the enter command.

As another example, a method is described that comprises defining a position of an ID or partial ID by means of an index in a master node and a slave node, the master and slave nodes being coupled together within a communication network, each slave node comprising a memory or other computer-readable medium having a multi-digit ID stored therein which enables unambiguous identification of the slave node within the communication network, each digit of the multi-digit ID exhibiting a predetermined value; transmitting a first probe command from the master node to the slave node, the first probe command defining, at that position of the ID or partial ID that is defined by the index, a first value "0" to be probed; comparing the first value "0" to be probed with a value at that position of a dedicated ID or partial ID that is defined by the index, in the slave node; transmitting an interrupt signal from the slave node responsive to the comparison resulting in that the first value "0" to be probed equals the value at that position of the dedicated ID or partial ID that is defined by the index, and that the slave node comprises an active status; transmitting a combined enter probe command from the master node to the slave node if the master node receives the interrupt signal upon a previously transmitted first or second probe command, the combined enter probe command having an effect of an enter command and of a subsequent first or second probe command; comparing the value "0" to be entered with a value at that position of the dedicated ID or partial ID which is defined by the index, in the slave node; changing a dedicated status of the slave node from the active status to an inactive status responsive to the comparison resulting in that the value "0" to be entered does not equal the value at that position of the dedicated ID or partial ID that is defined by the index; and changing the index by one position in a search direction in the master node and the slave node, responsive to the enter command.

As yet another example, a master node for a communication network is described, wherein the communication network comprises a communication connection, a master node, and one or more slave nodes, all interconnected via the communication connection, each of the one or more slave nodes comprising a memory or other computer-readable medium having a multi-digit ID stored therein that enables unambiguous identification of the slave node within the communication network, each digit comprising a predetermined value. The master node in this example comprises a transmitter that is connectable to the communication connection; and a process unit coupled to the transmitter. The process unit is configured to search for an ID or partial ID of one of the slave nodes, define, for the search, a position of the ID using an index, control the transmitter to transmit a first probe command defining, at that position of the ID or partial ID that is defined by the index, a first value "0" to be probed, control the transmitter to transmit an enter command defining, at that position of the ID or partial ID that is defined by the index, a value "0" to be entered, responsive to the master node receiving an interrupt signal, and change the index by one position in a search direction if the process unit controls the transmitter to transmit the enter command, and not change the index if the process unit controls the transmitter to transmit the first probe command.

As still another example, a slave node for a communication network is described, wherein the communication network comprises a communication connection, a master node, and one or more other slave nodes connected to the communication connection, each of the other slave nodes comprising a memory or other computer-readable medium having a multi-digit ID stored therein that enables unambiguous identification of that other slave node, each digit comprising a predetermined value. In this example, the slave node comprises a receiver configured to be connectable to the communication connection; a transmitter configured to be connectable to the communication connection; and a process unit coupled to the receiver and transmitter and configured to define, for a search for an ID or partial ID of a slave node, a position within a dedicated ID by means of an index. The receiver in this example is further configured to receive a first probe command that defines, at that position of the dedicated ID or partial ID that is defined by the index, a value "0" to be probed for the search, to receive an enter command that defines, at that position of the dedicated ID or partial ID that is defined by the index, a value "0" to be entered for the search. The process unit in this example is further configured to control the transmitter to transmit an interrupt signal if the receiver receives the first probe command and if the value "0" to be probed equals the value at that position of the dedicated ID that is defined by the index and the slave node is in an active status, to change the index by one position in a search direction if the receiver receives the enter command and the value "0" to be entered equals the value at that position of the dedicated ID or partial ID that is defined by the index, and not to change the index if the receiver receives the first probe command.

These and other aspects will be described in further detail in the following Detailed Description.

BRIEF DESCRIPTION OF THE DRAWINGS

Illustrative embodiments of methods of searching for an ID of a slave node within a communication network, e.g. a single-wire communication network, and of master nodes and slave nodes for such a communication network, will be explained below in more detail with reference to accompanying figures, in which.

DETAILED DESCRIPTION

Figure 1A:
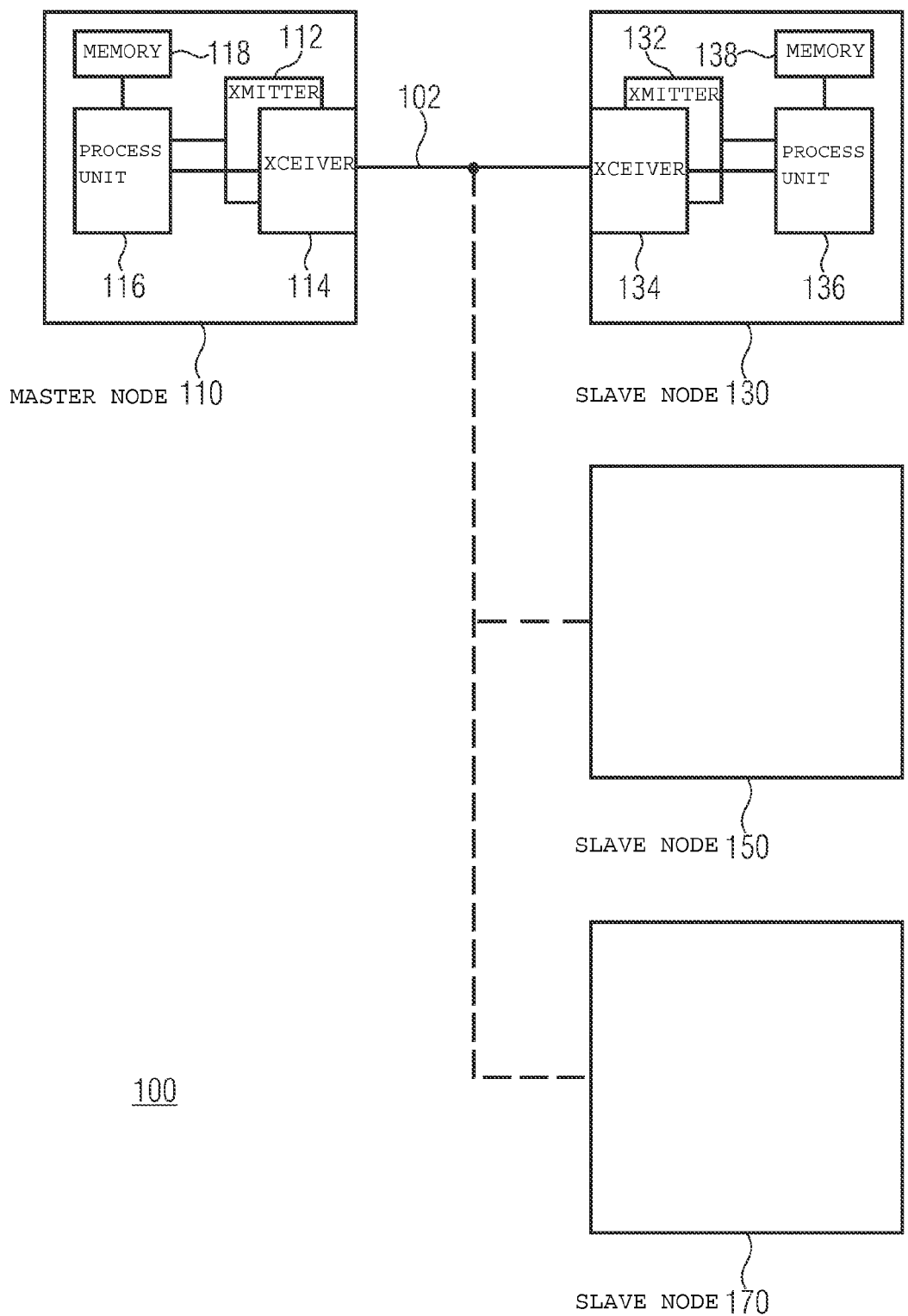
FIG. 1A shows a block diagram of first and third embodiments of a master node and at least one slave node which are connected by a single-wire communication network.

In the present application, identical reference numerals will be used for objects and functional units having identical or similar functional properties.

Embodiments of the method, of the master node and of the slave node will be explained below with reference to a single-wire communication network, but they are not limited thereto. For example, instead of the one wire, alternative embodiments may also comprise, as a communication connection, multiple-wire communication connections or other communication media than wires, e.g. fiberglass or radio, so as to connect the master node and the slave nodes to one another.

Single-wire communication networks, or single-wire communication systems, are hierarchic communication systems wherein a master node controls communication, and one or more slave nodes respond to said commands of the master node, for example by transmitting data or by confirming or not confirming commands or requests by the master node. The slave nodes may be configured to transmit, for example, a specific interrupt signal so as to confirm a request or a command of a master node, and to not transmit said specific conformation signal so as to signal to the master node that they are not confirming the request or command. The master nodes and the slave nodes are connected to one another via a single wire.

Single-wire communication may be based on that a high voltage level (a high) is applied, in principle, to the one wire, e.g. by means of a current or a voltage source, and that a single entity, master node or slave node, may reduce the level of the entire line to a low level by applying said low level (a low). A slave node may be configured to apply said low level as an interrupt signal, also referred to as Interrupt IRQ, and to leave the level at said high level for "non-confirmation", or "non-interrupt", purposes.

In this hierarchic communication system, the master node may also be referred to as a master device, or master for short, or as a superordinated node or control node, and the slave node may also be referred to as a slave device, or slave for short, or as a subordinate node or controlled node.

With regard to the activity status of the slave nodes, also referred to as status or state for short, the terms "active" or "activate" are also used for expressing that the slave node has an active state or that its status changes to the active status, and the terms "inactive" or "deactivate" for expressing that the slave node has an inactive state or that its status changes to the inactive status.

FIG. 1A shows a block diagram of a first or third embodiment of a master node 110, and of a first or third embodiment of a slave node 130, which are connected via a single wire 102 of a single-wire communication network 100.

The embodiment of the master node 110 comprises a transmitter 112 and a receiver 114 which are coupled or connected to the wire 102, and a process unit 116 coupled to the transmitter 112 and the receiver 114 so as to be able to evaluate and/or process communication signals received from the receiver 114 via the wire 102, and coupled to the transmitter 112 so as to control said transmitter 112 such that it transmits commands to one or more slave nodes via the wire 102, said one or more slave nodes being connected to the wire 102, so as to perform, e.g., a search algorithm for searching for an ID of a slave node.

In addition, the master node 110 comprises a memory 118 or other computer-readable medium coupled to the process unit 116 so as to store, for example, information for performing a search algorithm.

The slave node 130 comprises a transmitter 132 and a receiver 134, which are coupled or connected to the wire 102 so as to transmit or to receive communication signals via the wire 102, and a process unit 136 coupled to the transmitter 132 and the receiver 134 so as to be able to evaluate and/or process communication signals received from the receiver via the wire 102, and to control the transmitter such that it may transmit, via the wire 102, e.g. signals in response to commands of the master node 110.

The slave node 130 further comprises a memory 138 or other computer-readable medium connected to the process unit 136 in order to read out the data stored therein and, if need be, to file and/or store data there. The memory 138 or other computer-readable medium is configured to store an ID enabling unambiguous identification of the slave node in the single-wire communication network 100. In addition, the memory 138 or other computer-readable medium is configured to store information for performing a search algorithm, or for performing a slave portion of the search algorithm, for example an index or pointer which determines a current position, or digit, in the ID when the search algorithm is performed. The memory 138 or other computer-readable medium comprises a non-volatile memory portion, for example, for storing the ID, and a volatile memory portion, for example, for storing the index or pointer or pointer value and further information such as its own activity status.

Figure 2:
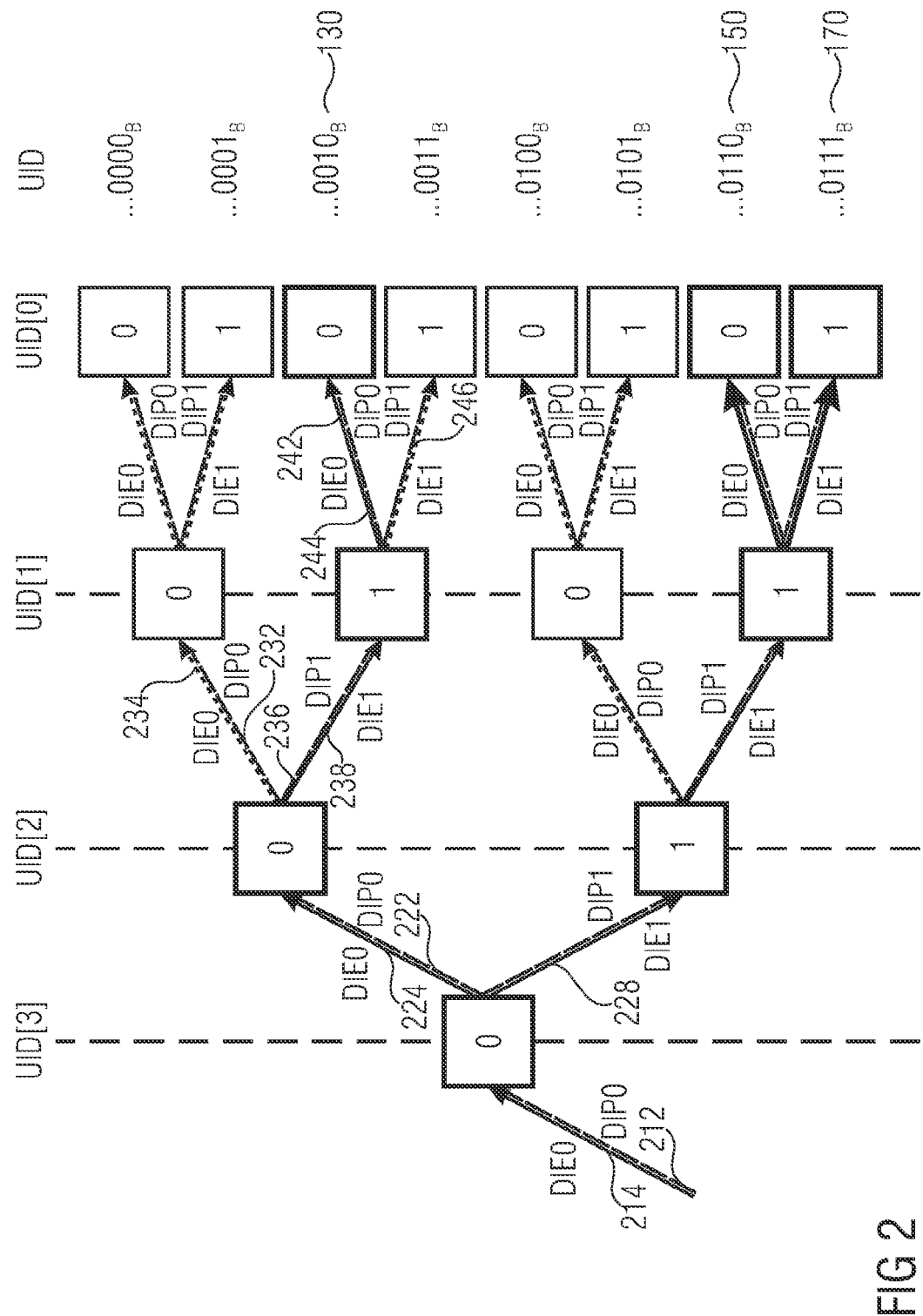
FIG. 2 shows an embodiment of a binary search tree in accordance with first and second embodiments.

FIG. 2 shows an exemplary binary search tree for searching for a binary ID having 4 digits, or 4 bits. The IDs may comprise the values of "0000" to "1111", the left-hand bit also being the most significant bit (MSB), and the right-hand bit being the least significant bit (LSB).

Typically, indexing of the positions of the ID starts with the index 0 for the least significant bit, which index then increases continuously, typically is increased by 1 per position in each case, and ends with the highest index 3 or N−1.

The individual positions of an ID may then be addressed or determined by means of the corresponding indices, the indices serving as pointers to the respective positions, or digits, within the ID. The memory uid storing the ID is drawn in, at the top of FIG. 2, in square brackets along with the respective index. The arrows in FIG. 2 indicate all of the potential branches of a binary search tree which may be passed through in the course of the search process and/or while the search algorithm is performed. The search tree or the search algorithm starts at the most significant bit uid[3] and probes successively, i.e. position by position, whether the single-wire communication network 100 has a slave node, e.g. 130, 150, 170, connected to it which has a specific binary value at the current or next position.

Embodiments of the method of searching for an ID or partial ID of a slave node within a single-wire communication network, and embodiments of a master node and a slave node within such a single-wire communication network will be described, by way of example, using the four-digit binary ID words of FIG. 2.

FIG. 2 shows a binary search tree for the 4-digit ID, wherein a first slave node 130 having the ID "0010" (B stands for binary), a second slave node 150 having the ID "0110", and a third slave node 170 having the ID "0111" are connected to the single-wire communication network. The positions of the ID (identifier) and its respective indices from 0 to 3 are drawn in at the top of FIG. 2. In FIG. 2 the sub-tree for all of the IDs comprising the most significant bit "0" is depicted, the sub-tree (see arrows) being drawn as starting from the most significant bit having the index 3, see UID[3], right up to the leaves of the search tree having the least significant bit and the index 0, see UID[0].

In other words, FIG. 2 shows a binary search tree for a search wherein the most significant bit is used as a starting position, or the respective index is used as a starting index, the least significant bit is used as an end position and/or the respective index is used as an end index, and the pointer or index is shifted, in the search direction from the starting position to the end positions or leaves, to the right by one position or is reduced, i.e. it is decremented. In alternative embodiments, the index may be incremented instead.

The search tree comprises nodes and paths (see arrows), each path from the starting position to an end position representing a potential ID of a slave node, as is depicted in FIG. 2. A node of the search tree represents a potential binary value at a specific position of the ID. In according with an embodiment, the search tree is passed through position by position or node by node during the search, and a probe is performed, for each node, to see whether there are slave nodes comprising an ID or partial ID which corresponds to the path taken, or entered, until then.

The term "to enter" in the sense of "entering a path" will be used below when the index is decremented and when, thus, one proceeds one position to the right with regard to the search tree of FIG. 2, and the term "to probe" will be used below when a value at a position of the ID, said position being defined by the index, is probed. The index is not changed during probing.

Potential commands of an embodiment will be explained in more detail below with reference to a list of commands:

DISS (start search command)—starting the search ID algorithm,
DIP0 (probe zero command)—comparing the value of the current node or position with the bit value of "0"
DIP1 (probe one command)—comparing the value of the current node or position with the bit "1"
DIE0 (enter zero command)—entering the "0" node or the next position having the bit "0",
DIE1 (enter one command)—entering the "1" node or the next position having the bit "1",
DI00 (combined enter zero probe zero command)—combines the commands DIE0 and DIP0,
DI01 (combined enter zero probe one command)—combines the commands DIE0 and DIP1,
DI10 (combined enter one probe zero command)—combines the commands DIE1 and DIP0,
DI11 (combined enter one probe one command)—combines the commands DIE1 and DIP1,
DIMM (memory command)—memorizing the current search position and the activity status,
DIRC (recall command)—recalling or reading out the memorized current search position and the stored current activity status,
DILC (length check command)—slave node responds with interrupt signal IRQ when the search process has reached the last bit.

The following elements or definitions of an exemplary code of an embodiment of a search process or a search algorithm will be used below:

---

Idptr: pointer to internal ID bit position, index
Idptr_mem - stored pointer to internal ID bit position,
Uid[x]: memory array that holds the ID bit stream, with "x" as the index which selects and/or defines the desired bit,
Active: device status or activity status of the slave node, which may be "True" when the slave node is active, or "False" when the slave node is deactivated and does not respond to further probes, or probe requests,
Active_mem: stored status of the slave node or slave device,
Assert_SWI_IRQ or Assert_SWI_Interrupt: slave node responds with interrupt signal IRQ via a wire communication interface,
Wait_SWI_IRQ or Wait_SWI_Interrupt: waiting for interrupt signal IRQ on the single-wire communication interface,
Device_id_length: number of positions of the ID, also referred to as the ID length.

---

The exemplary code reads as follows:

---

```
CASE command
    DISS: // Device ID Search Start
        idptr = device_id_length−1
        active = True
    DIE0: // Device ID Search Enter Zero
        if idptr==0 or uid[idptr]==1
            active = False
        idptr−−
```

-continued

```
DIE1: // Device ID Search Enter One
    if idptr==0 or uid[idptr]==0
        active = False
    idptr--
DIP0: // Device ID Search Probe Zero
    if uid[idptr]==0 and active==True
        Assert_SWI_Interrupt
    else
        Wait_SWI_Interrupt
DIP1: // Device ID Search Probe One
    if uid[idptr]==1 and active==True
        Assert_SWI_Interrupt
    else
        Wait_SWI_Interrupt
DI00: // combined Device ID Search Enter Zero Probe Zero
    if idptr==0 or uid[idptr]==1
        active = False
    idptr--
    if uid[idptr]==0 and active==True
        Assert_SWI_Interrupt
    else
        Wait_SWI_Interrupt
DI01: // combined Device ID Search Enter Zero Probe One
    if idptr==0 or uid[idptr]==1
        active = False
    idptr--
    if uid[idptr]==1 and active==True
        Assert_SWI_Interrupt
    else
        Wait_SWI_Interrupt
DI10: // combined Device ID Search Enter One Probe Zero
    if idptr==0 or uid[idptr]==0
        active = False
    idptr--
    if uid[idptr]==0 and active==True
        Assert_SWI_Interrupt
    else
        Wait_SWI_Interrupt
DI11: // combined Device ID Search Enter One Probe One
    if idptr==0 or uid[idptr]==0
        active = False
    idptr--
    if uid[idptr]==1 and active==True
        Assert_SWI_Interrupt
    else
        Wait_SWI_Interrupt
DIMM: // Device ID Search Memory
    idptr_mem = idptr
    active_mem = active
DIRC: // Device ID Search Recall
    idptr = idptr_mem
    active = active_mem
DILC: // Device ID length check
    If idptr < 0
        Assert_SWI_Interrupt
    else
        Wait_SWI_Interrupt
```

The range of the indices or of the values of the index idptr is from "device_id_length−1" to "−1", the parameter device_id_length indicating the length or the number of positions of the ID, and in the following examples in accordance with FIG. 2 comprises the value of 4.

Embodiments of the method, of the master node and/or of the slave node may be subdivided into four general embodiments with regard to the set of commands used:
1. First embodiment comprising a set of commands including the commands DISS, DIE0, DIE1, DIP0, DIP1 and optionally DILC,
2. Second embodiment which comprises the commands DIMM and DIRC in addition to the first embodiment,
3. Third embodiment which comprises, in addition to the commands of the first embodiment, at least one of the combined enter probe commands DI00, DI01, DI10 and DI11, and
4. Fourth embodiment comprising the commands of the first three embodiments.

The command DIE0 may also be referred to as an "enter 0 command", the command DIE1 may be referred to as an "enter 1 command", the command DIP0 may be referred to as a "probe 0 command", the command DIP1 may be referred to as a "probe 1 command", the command DI00 may be referred to as an "enter 0 probe 0 command", the command DI01 may be referred to as an "enter 0 probe 1 command", the command DI10 may be referred to as an "enter 1 probe 0 command", and the command DI11 may be referred to as an "enter 1 probe 1 command". In addition, the command DIEx may be used as a collective term for the two enter commands of DIE0 and DIE1, the term DIPx may be used as a collective term for the probe commands DIP0, DIP1, and the term DIxx may be used as a collective term for the four combined enter probe commands.

Figure 1B:
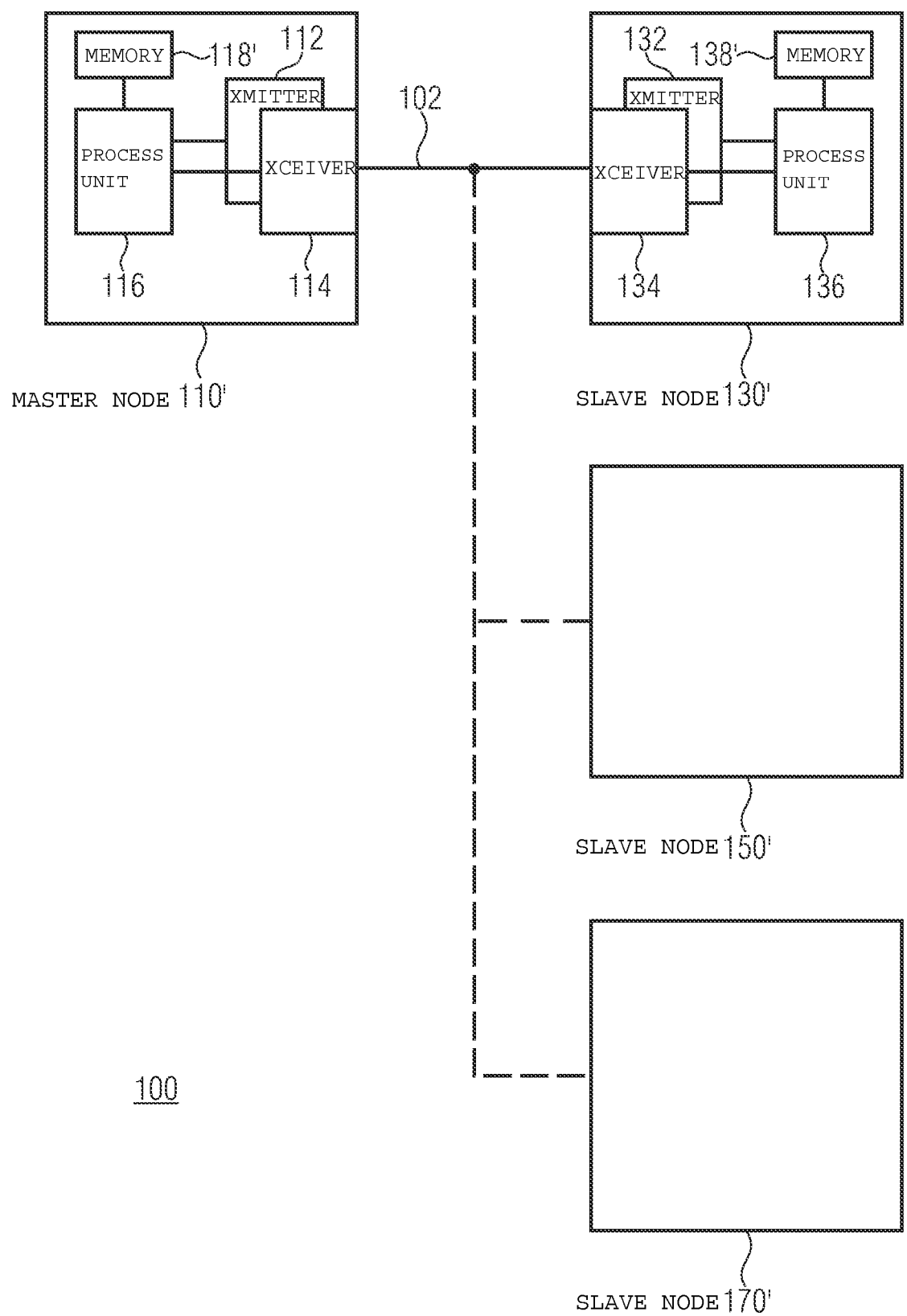
FIG. 1B shows a block diagram of second and fourth embodiments of a master node and at least one slave node which are connected by a single-wire communication network.

As was explained above, FIG. 1A shows a master node 100 and slave nodes 130, 150, 170 in accordance with a first or third embodiment, and FIG. 1B shows a master node 100' and slave nodes 130', 150', 170' in accordance with a second or fourth embodiment, which nodes comprise, in addition to the embodiments of FIG. 1A, a memory or other computer-readable medium for the index of the last branching node or the last branch, wherein the slave nodes additionally comprise a memory or other computer-readable medium for storing their own states or the statuses for the respective index or the status that the respective slave node had when the index was the current index and before the index was decremented because of an enter command DIEx.

In addition, it shall be noted that the exemplary code represents a potential program code of an embodiment of a slave node, i.e. it describes the actions or steps passed through by the slave node and/or performed by the process means 136 when the slave node 130, 150, 170 receives the respective command via the receiver 134.

Figure 3:
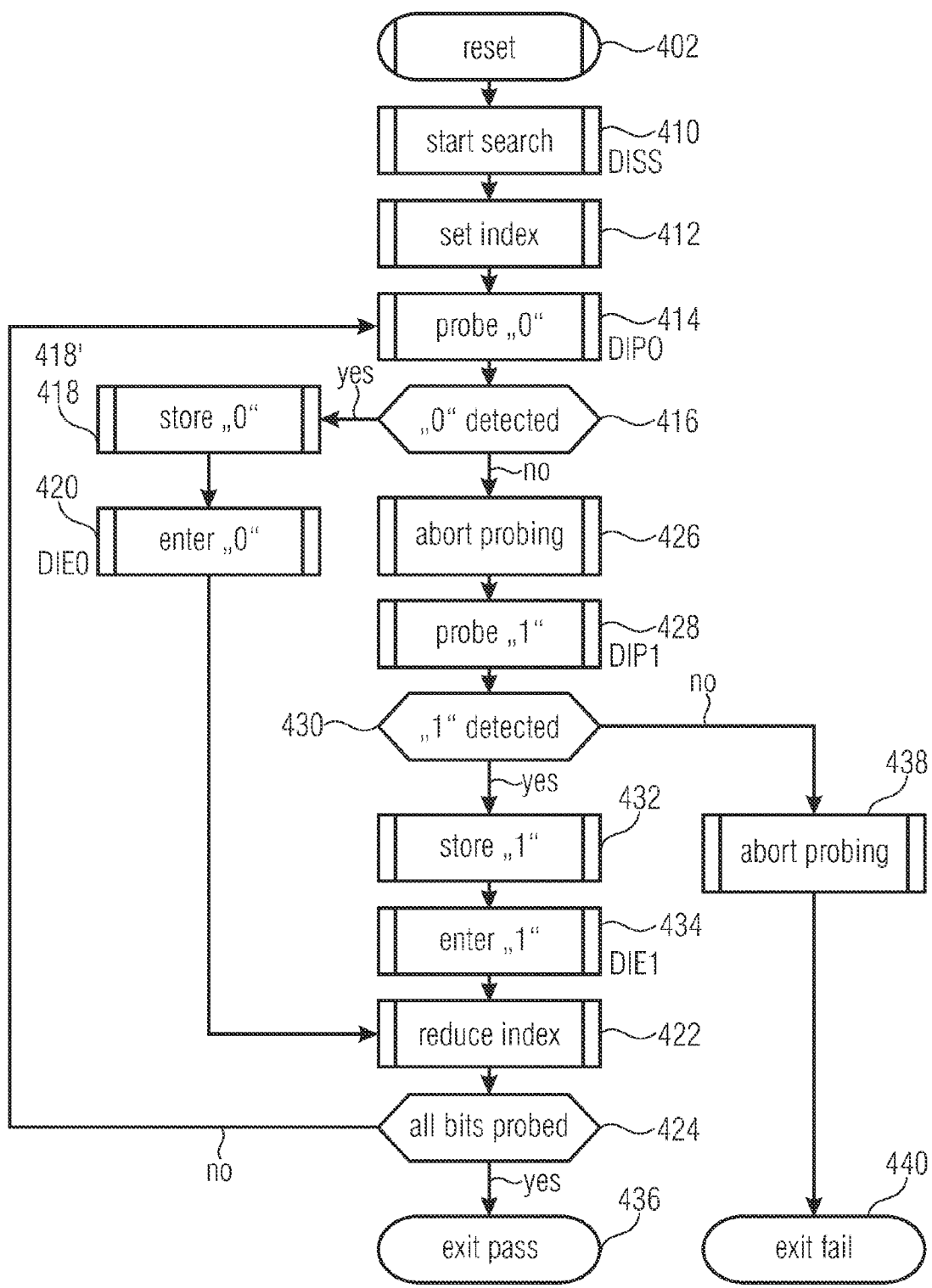
FIG. 3 shows a flowchart of a method of searching for a slave node having an unknown ID, said method being performed by a master node of a first or second embodiment.
Figure 4:
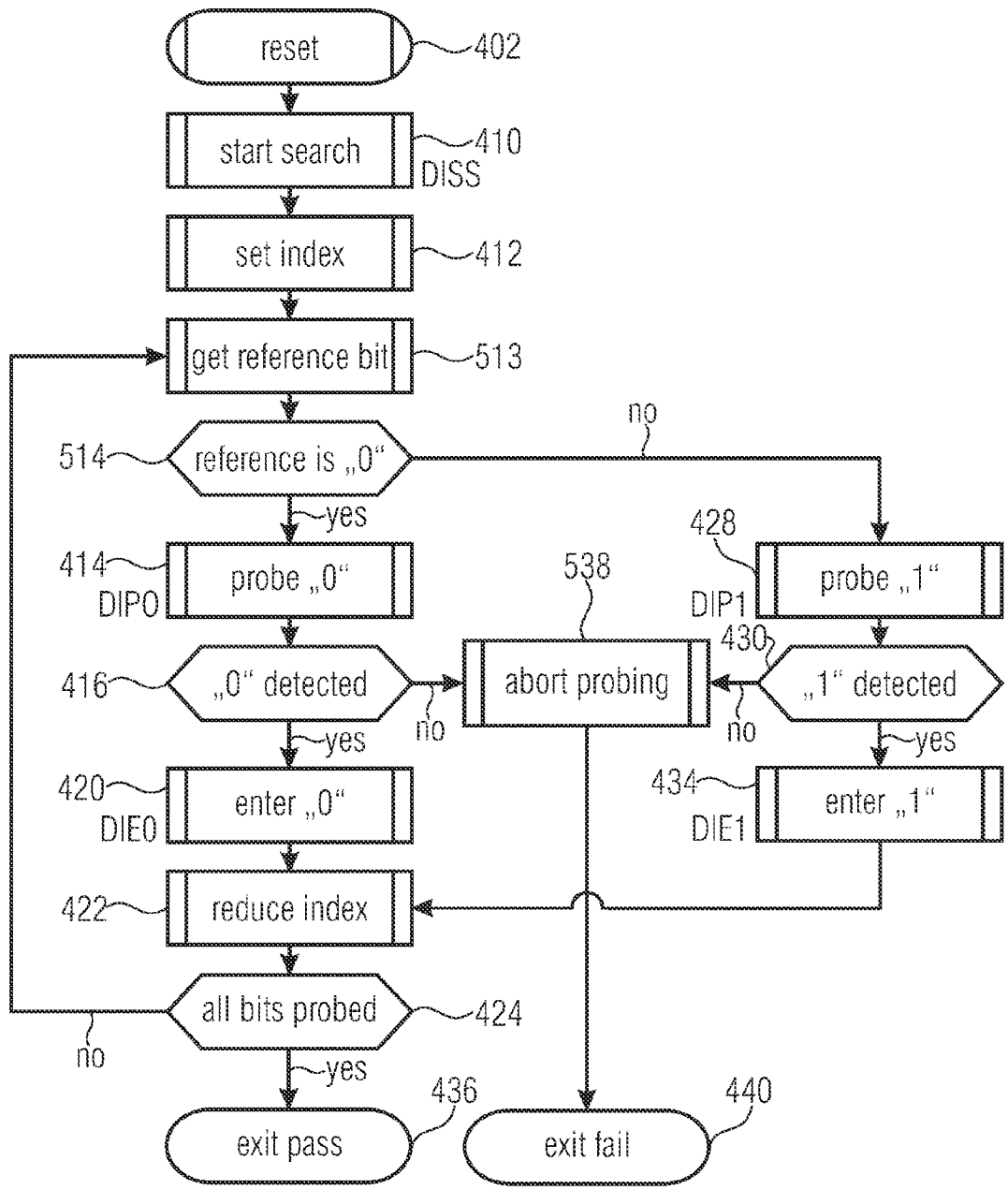
FIG. 4 shows a flowchart of a method of searching for a slave node having a known ID, said method being performed by a first embodiment of a master node.
Figure 5:
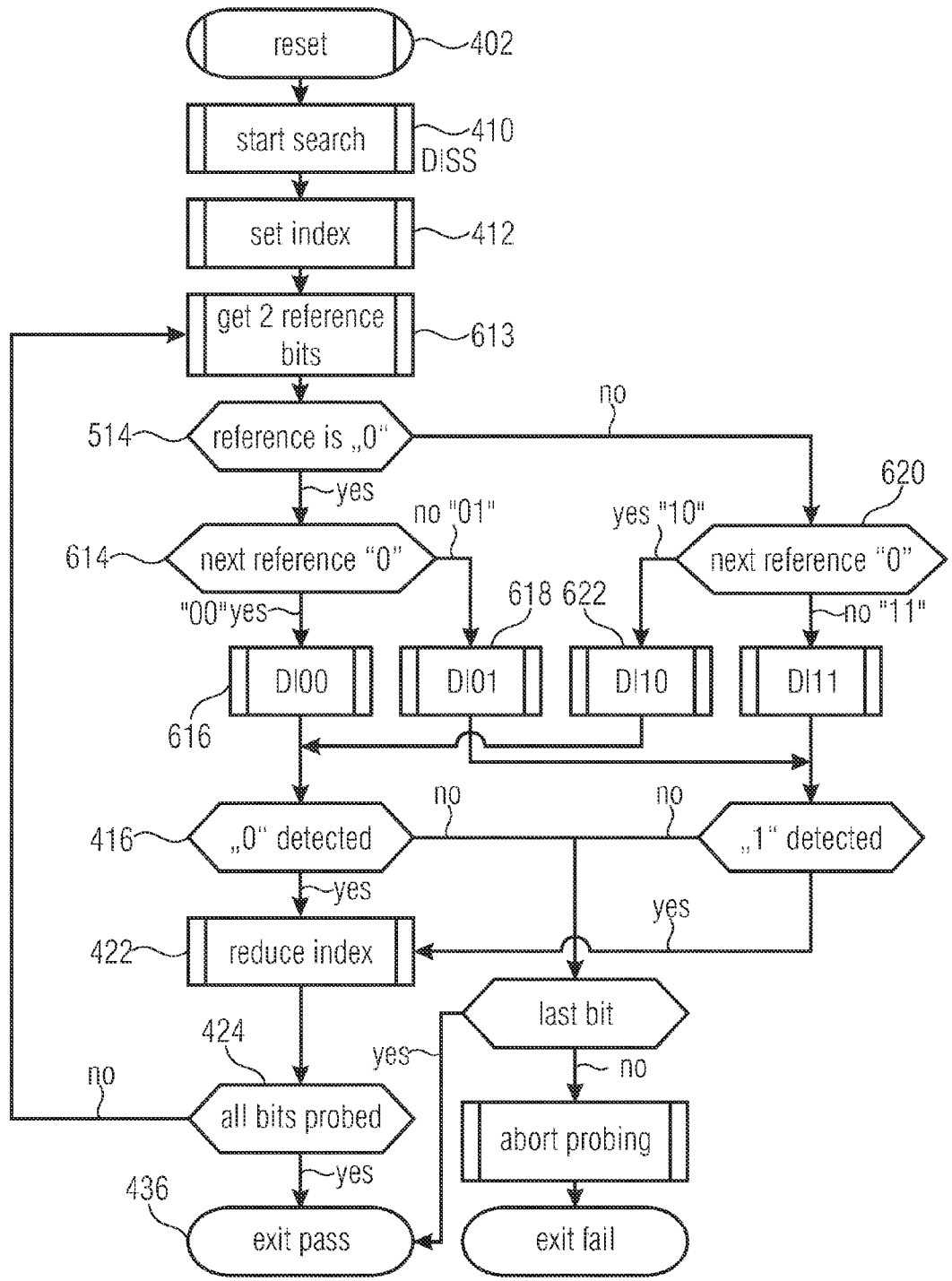
FIG. 5 shows a flowchart of a method of searching for a slave node having a known ID, said method being performed by a third embodiment of a master node.
Figure 6:
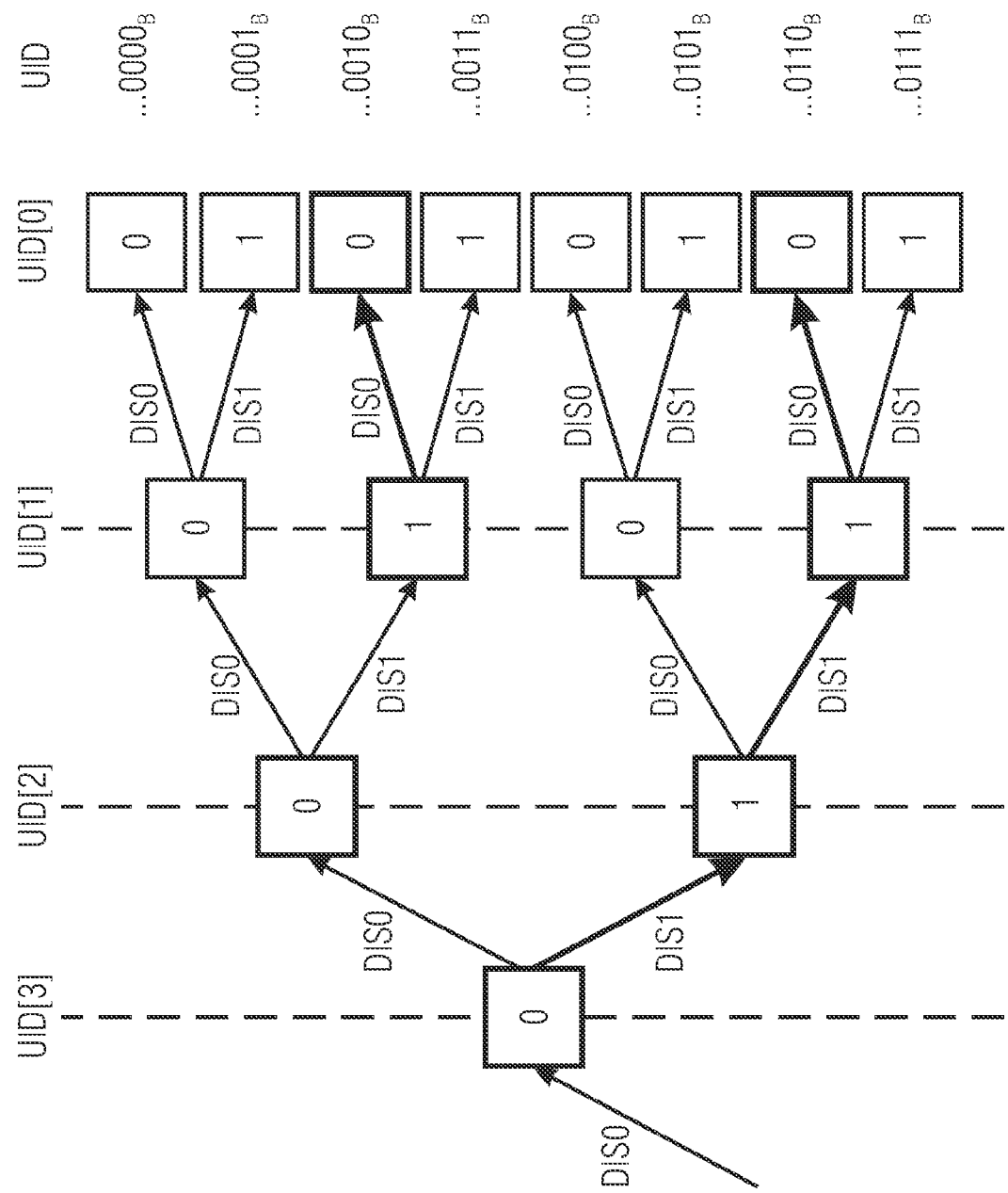
FIG. 6 shows a binary search space for a known search algorithm performed by a master node.

FIGS. 3 to 5, by contrast, show flowcharts which concern control of the master node, specifically: FIG. 3 shows a flowchart of a first embodiment of the search for an unknown or random ID, FIG. 4 shows a flowchart of a first embodiment of a known ID or reference ID, and FIG. 5 shows a flowchart of a third embodiment of the search for a known ID or reference ID.

A first embodiment of the method of searching for an ID of a slave node of a single-wire communication network is to be initially described using the exemplary code of FIGS. 1A, 2 and 3. The flowchart of FIG. 3 describes the search for an unknown ID as is performed, for example, by the master node 110 so as to ascertain whether any slave nodes are connected to the single-wire communication network and which IDs the connected slave nodes 130, 150 and 170 have. This search may also be referred to as an open search.

In FIG. 3, the passed through by the master node 110 are shown and explained in note form and are supplemented by the respective commands transmitted by the master node and received by the slave nodes, in addition to the blocks of the flowchart.

For the following explanations, the same elements, e.g. idptr for the index, will be used as far as possible both for the master node and for the slave nodes, and for similar processes, e.g. decrementing the index, which is performed both by the master node and the slave nodes, reference shall be made, also in order to explain the master node, to corresponding positions of the codes of the slave nodes.

Before starting the search, the master node 110 is reset in step 402.

In step 410, the master node starts the search by transmitting the command DISS via the single-wire communication network and, in step 412, by setting the index to a starting value by analogy with the slave nodes, or by initializing said index, i.e. by setting idptr=device_id_length_1=4−1=3, since in the example of FIG. 2, the ID length or the device_length has the value of 4. Thus, the index defines the most significant bit uid[3] of the ID. Accordingly, after receiving the command DISS, the slave nodes 130, 150, 170 set (initialize) the index idptr also to the value of 3 and set their state or their state parameter "active" to the value of True (see program code).

In step 414, the master node transmits the probe 0 command DIP0 (also cf. reference numeral 212 in FIG. 2) to probe whether a slave node comprising an ID which has the value of "0" as the most significant bit is connected to the single-wire communication network. In accordance with the program code for the command DIP0, the slave nodes 130, 150, 170 probe whether the value at the position defined by the index (uid[idptr]) is equal to, or matches, the value of "0" which is defined by the probe command DIE0 and is to be probed, and whether they are active, i.e. whether their own respective activity status has the value "True". On account of the preceding DISS command, all of the slave nodes are active, and, as may be seen in FIG. 2, all of the three slave nodes 130, 150, 170 have the value of "0" at the position uid[3], so that all of the three slave nodes transmit the interrupt signal IRQ (see "Assert_SWI_Interrupt") via the single-wire communication network.

In step 416, the master node probes whether a "0" has been detected, i.e. whether a slave node has the value of "0" at the current position and has transmitted the interrupt signal. In this case, an interrupt signal has been transmitted (see "yes"), so that the master node stores the value of "0" in an ID memory in step 418, the ID memory storing the partial IDs and/or IDs of the slave nodes which have been found on the part of the master node by a search.

In step 420, the master node 100 then transmits the enter command DIE0 (see reference numeral 214 in FIG. 2).

Upon receipt of the command DIE0, the slave nodes probe whether the index idptr equals 0, i.e. whether the last position in accordance with the order of the search, or the least significant bit, has been reached. This is not the case, since idptr has the value of 3. In addition, the slave nodes probe whether the dedicated ID at the position defined by the index (uid [idptr]) has the value of "1", i.e. whether it does not have the value of "0" defined by the enter command DIE0. As may be gathered from FIG. 2, all of the three slave nodes have the value of "0" at this position UID[3], so that none of the two conditions mentioned in the program code is met, and so that, therefore, all of the three slave nodes remain active. In addition, the slave nodes decrement the index from 3 to 2 (see code).

The master node proceeds in a similar manner in step 422, i.e. the master node, too, reduces the index, or decrements its own index.

In step 424, the master node probes whether it has probed all of the bits, or, in other words, whether it has probed all of the positions, for example by probing whether the index is smaller than 0. Since the index idptr has the value of 2, the master node will recognize that not all of the bits have been probed yet, and it will return to step 414 and transmit a probe command DIP0 (see 222 in FIG. 2).

As was already the case for the first bit position uid[3], all of the slave nodes proceed in accordance with the program code for the command DIP0, and they now probe whether their own ID has the value of 0 at the position uid[2], and whether they are active. All of the three slave nodes are active, but only the first slave node 130 has the value of "0" at the current position idptr=2. The other two slave nodes 150, 170 have the value of "1" at this position, as may be seen from FIG. 2. Thus, only the first slave node 130 will transmit the interrupt signal IRQ.

Thus, the master node 100 recognizes that at least one slave node has the value of "0" also at the second position, and accordingly (see "yes"), it performs step 418 following step 416, i.e. the master node stores the value of "0" at the second position of the ID memory, in accordance with the current index.

Upon storing, the master node transmits the enter command DIE0 in step 420 (see 224 in FIG. 2).

Upon receipt of the enter command DIE0, the three slave nodes probe, as is described in the program for the command DIE0, whether the last position has been reached or whether the value of their own ID has the value of "1" at the current position uid[2]. As may be seen from FIG. 2, this is not the case for the first slave node 130. Thus, the first slave node 130 remains active and decrements its own index from the value of 2 to the value of 1. The second and third slave nodes 150, 170, however, have the value of "1" at the position uid[2], so that they change their state to the inactive state, or deactivate themselves or become deactivated (active=False) and then decrement their index just like the first slave node.

The master node also decrements its index in step 422, so that the master node and the slave nodes have stored, each of them for themselves, the same current index so as to guarantee access to the same position in an ID.

In step 424, the master node again verifies whether all of the bits have been probed. This is not the case ("no"), so that the master node transmits a third DIP0 command, see reference numeral 232 in FIG. 2.

Upon receiving the command DIP0, all of the slave nodes 130, 150, 170 probe whether their own value comprises the value of "0" at the position uid[1], and whether they are active. Since the second and third slave nodes 150, 170 are no longer active, they can no longer transmit an interrupt, even if they did have the value of "0" at this position. The first slave node 130 is still active but has a "1" at the current position uid[1] of its ID, and thus it does not meet the condition for transmitting an interrupt signal. Therefore, none of the slave nodes transmits an interrupt signal.

Once a predefined response time period has expired, the master node recognizes, in accordance with step 416, that no slave node has transmitted an interrupt signal or that none of the active slave nodes has the value of "0" to be probed at the current position (see "no").

Because of the previous probing, by means of the probe command DIP0, as to whether a slave node comprising a "0" at the current position is connected to the network it is avoided that unlike conventional methods, the master node enters the path 234 or transmits the enter command DIE0 with the reference numeral 234 without probing, and thus will end up at a dead end and will have to start again from the beginning, for example, i.e. it would have to probe a next path from the roots of the search tree.

For differentiation purposes, the arrows associated with probe commands have been drawn using dashed lines in FIG. 2, arrows associated with enter commands which lead to a valid or existing ID have been drawn using solid lines, and dead ends or enter commands which have not been transmitted have been drawn using dotted lines.

Therefore, the master node aborts further probing for the value of "0" at this position (see step 426), and in step 428 it transmits the probe command DIP1, see 236 in FIG. 2.

Upon receiving the command DIP1, all of the slave nodes probe, by analogy with the probe command DIP0, whether they have the value of "1" at the current position UID[1], and whether they are active. In this case only slave node 130 is still active, and it additionally has the value of "1" at the position, so that said slave node 130 transmits an interrupt signal IRQ in response to the command DIP1.

The master node 110 receives the interrupt signal IRQ in step 430, and thus it recognizes that at least one active slave node having an ID which has the value to be probed at the current position ("yes") is connected to the communication network, and subsequently it stores, in step 432, the value of "1" for the index 1 of the ID within the ID memory.

In step 434, the master node transmits the enter command DIE1, see reference numeral 238 in FIG. 2.

Upon receiving the command DIE1, the slave nodes probe whether the last position has been reached or whether their own ID has the value of "0" at the position uid[1]. The first slave node 130 does not meet this condition, so that it remains active and merely decrements the index to the value of "0". The other two slave nodes also decrement their indices.

The master node also decrements its own index to the value of "0" in step 422.

Since not all of the bits have been probed yet, see step 424 and the arrow "no", the master node transmits, in step 414, the command "DIP0", reference numeral 242 in FIG. 2. The second and third slave nodes 150, 170 are deactivated and therefore cannot transmit any interrupt signal, even though, for example, the second slave node 150 has the value of "0" to be probed at the position uid[0] and thus meets the first condition in accordance with the program code. However, the first slave node 130 is active and also meets the first condition, i.e. it has the value of "0" at the position uid[0], and therefore transmits an interrupt signal IRQ to the master node.

Thus, the master node detects in step 416 that a corresponding slave node exists (see "yes"), and in step 418 it stores the value of "0" at the position uid[0] in its ID register.

Thereupon, the master node 110 transmits the enter command DIE0 in step 420, see 244 in FIG. 2.

Since the current index has the value of "0", i.e. defines the last position of the ID, the first slave node 130 deactivates itself (see program code) and decrements its index to the value of "4", just like the two other slave nodes.

The master node, too, reduces its index one more time in step 422 and thus recognizes in step 424 that all of the bits have been probed, and it completes the first search run successfully (yes), see step 436. Thus, the master node has found the ID of the first slave node 130, namely "0010", and has stored it in its ID memory.

In the first embodiment, the master node 110 is configured to store, e.g., the index of that position where the master node last received an interrupt signal in response to a probe zero command DIP0, the index "1" in FIG. 2, so as not to probe, once again, the value of "0" for the next index idptr=0, by analogy with the first run after entering the path 238 or transmitting the enter command DIE1 238, but to probe the value "1" by means of the probe one command DIP1, see reference numeral 246 in FIG. 2. This index, or this position, is also referred to as a branching index or branching position, since they describe a position where the path might also have been entered in another direction.

Since the slave node 130 does not have the value of "1" at this position, and since the other slave nodes are already deactivated, the master node does not receive any interrupt signal and thus finds that this ID does not exist within the network.

The second embodiment, which comprises the commands DIMM for storing a current index and status in a slave node, and the command DIRC for recalling the stored status and the stored index in a slave node, enables a considerably faster return to such last "branching positions" and avoids that in a next search run the entire tree has to be passed through once again from the beginning.

In the second embodiment, the master node 110' has essentially the same features as the master node 110 (see FIG. 1B), the memory 118 being implemented as a memory 118' which is additionally configured to store a current index value, and the slave nodes 130', 150', 170' having essentially the same features as the slave nodes 130, 150, 170 (see FIG. 1B), the memory 138 being implemented as a memory 138' which is additionally configured to store a current index of its own (see idptr_mem in the program code) and a current activity status, or status, of its own (see active_mem in the program code). With regard to an individual search run for determining an ID, the run or the flowchart corresponds to that of the first embodiment of FIG. 3, but additionally comprises the steps of transmitting the memory command DIMM to potential or actual branching points within the search algorithm on the part of the master node, and the step of recalling the stored indices or dedicated activity statuses of the slave nodes at the end of a search run so as to perform a next search run by starting at the last branching point.

Actual branching positions or branching nodes are such branching positions at which the master node has previously positively probed, by transmitting both probe commands DIP0 and DIP1, that both paths may be entered, i.e. that slave nodes comprising IDs for both bit values exist at this position.

By contrast, potential branching positions or branching nodes are such branching positions at which the master node previously already received an interrupt signal IRQ upon transmitting only a probe command, e.g. DIP0, and has not transmitted a second probe command DIP1 in order to probe whether a slave node transmits an interrupt for this value, too.

With regard to the flowchart shown in FIG. 3, the step 418', also depicted in FIG. 3, comprises transmitting the memory command DIMM on the part of the master node 110', in addition to step 418, before the master node transmits the enter command DIE0 in step 420.

When the master node transmits the memory command DIMM, it stores, at the same time, the current index idptr as idptr_mem. Upon receiving the memory signal DIMM, the slave nodes 130', 150', 170' store, independently of their activity status, their current index idptr as idptr_mem, and their current active status (True/False) as active_mem (see program code regarding the command DIMM). With reference to FIG. 2, the master node 110' transmits the memory command DIMM prior to transmitting the enter command 224. Thus, both the master node and the slave nodes store the index 2 as a return index idptr_mem, which might be returned to by means of the recall command DIRC.

In the further course of the first search run, however, the probe zero command DIP0 242 is then also confirmed by the first slave node 130, a further memory command DIMM is transmitted by the master node, and, thus, the index "0" is stored in the index memory idptr_mem of the slave nodes and of the master node, and, therefore, the index value of "2" which has been stored by now is overwritten by the value of "0" for identifying the last possible branching position. The slave nodes additionally store their own state, which is associated with the stored index, i.e. slave node 130 stores the active state, or "True", and the other two slave nodes 150', 170' store their inactive status, i.e. the status "False". Concerning the statuses of the individual slave nodes, reference shall be made to the explanations given with regard to the first example in accordance with FIG. 1A.

Thus, upon completion of the first search run, step 436, master node 110' may start a second search run which continues directly at the last stored search status. The master node 110' initiates this by transmitting the recall command DIRC. At the same time, the master node loads the index "0" as the current index from idptr_mem back in idptr, and the slave nodes load their stored indices idptr_mem as the current index idptr and their stored statuses active_mem back to their memory as the current status active. Thus, the first slave node 130' is active again, but the two other slave nodes continue to be inactive. In the second search run, the master node 110' now directly transmits the probe one command DIP1 (see 246 in FIG. 2) instead of the probe zero command DIP0 (see 242 in FIG. 2) so as to probe whether slave nodes comprising the ID "0011" are possibly connected to the single-wire communication network. In the embodiment shown in FIG. 2, this is not the case, so that the master node 110' obtains no interrupt signal and thus recognizes, once a predefined time period has expired, that no active slave node comprising the value of "1" at the position uid[0], and therefore no slave node comprising, overall, the ID "0011", is connected to the single-wire communication network.

One variant of the second embodiment is configured to start a third search run, again starting from the roots of the search tree, and to enter the path 228, for example after entering the path 214.

A further variant of the second embodiment comprises more than one memory array for a stored index and a stored status, so that by means of transmitting the command DIMM several times, several indices idptr and the corresponding statuses active are stored as idptr_mem[j] and active_mem[j] in the slave nodes in a temporal sequence or in the sequence of passing through the search tree, and may be recalled from the memory by transmitting the command DIRC several times in the opposite direction. In other words, the index or status that was stored last is read out, in the first recall command, as the current index or status, the index or status that was stored second but last is read out by the second recall command, etc. In such embodiments, the commands DIMM and DIRC function, in other words, like stack memory commands PUSH and POP, and, thus, e.g., several DIMM commands are performed successively, and/or several DIRC commands are performed successively. In such embodiments comprising several DIMM commands, all of the branches may be processed recursively, for example.

Concerning this, the previously described embodiments comprising only one memory idptr_mem form, in other words, the special case of having a stack memory depth of "1".

In the example shown in FIG. 2, the master node and the slave nodes would store the following possible branching indices in a temporal sequence in steps 418', starting with the index j=1 for the first stored branching index, by transmitting three DIMM commands:

idptr_mem[1]=3, idptr_mem[2]=2 and idptr_mem[3]=0. By transmitting three recall commands, the branching indices would be read back into the search index idptr in a reverse order, and the statuses would be read back into the search statuses active.

The third embodiment, wherein the commands also comprise the combined enter probe commands, will be described below on the basis of FIG. 3.

A method in accordance with the third embodiment, just like a method in accordance with the first embodiment, starts with steps 402 to 418, for example.

The master node 110' is configured to transmit the combined enter zero probe command DI00, following steps 422 and 424, instead of the separate commands DIE0 in step 420 and DIP0 in step 414. As the term "combined" indicates, said combined command DI00 is a combination of the individual commands enter zero DIE0 and probe zero DIP0, and also includes decrementing the index by means of the enter command, and subsequent probing (see code).

In addition, the method in accordance with the third embodiment comprises a combined enter 1 probe 0 command DI10 instead of the enter command DIE1 in step 434 and of the probe command DIP0 in step 414. Said combined command DI10 is a combination of the individual command enter 1 DIE1 with a subsequent probe zero command DIP0 (see code).

The two other combined enter probe commands are not employed in this embodiment.

Unlike FIG. 3, the flowchart may generally be adapted such that, when the second but last position is reached, i.e., e.g., when the index "1" is reached, no combined enter probe command DIxx is transmitted, but only a simple enter command DIEx so as to then, after step 424, successfully end the search run, possibly with step 436, and to possibly start a new search run.

With reference to FIG. 2, the master node 110 thus transmits the following commands: the probe command DIP0 212, the combined enter 0 probe 0 command 214, 222 instead of the individual commands DIE0 214 and DIP0 222, a further combined enter 0 probe 0 command 224, 232 instead of the individual commands DIE0 224 and DIP0 232, because of the lack of the interrupt signal for UID[1]=0 in response to the combined enter 0 probe 0 command 224, 232, since there is no slave node having such a partial ID, a combined enter 1 probe 0 command 238, 242 instead of the individual commands DIE1 238 and DIP0 242, and, finally, the enter command DIE0 242.

Methods in accordance with the third embodiment therefore may utilize fewer commands than embodiments in accordance with the first method, and thus enable the search for IDs of individual slave nodes to be accelerated.

In accordance with a fourth embodiment, utilization of the combined enter probe commands DIxx may also be combined with the memory command DIMM (see step 418') and the recall command DIRC in the method, as results from FIG. 3 and the preceding explanations, so as to further accelerate the search.

FIG. 4 shows a flowchart of a program for a master node 110 for searching for an ID of a slave node, the ID being known as a reference ID. This may also be referred to as a closed search.

Similarly to FIG. 3, the method starts with the steps 402 to 412, i.e. the master node transmits a start command DISS, the indices are initialized, and the slave nodes are activated.

Since the ID is known, in step 513 the master node gets the value of the respective position defined by the index from the ID memory, said value having been previously created, for example, using a method of FIG. 3.

Similarly to FIG. 3, the method starts the search itself with the most significant bit and then performs the search in accordance with the search tree from the most significant bit to the least significant bit. If one assumes that the reference ID is, for example, the ID of the first slave node 130, the master node gets a "0" (uid[3] in FIG. 2) as the first reference bit, ascertains in step 514 whether the reference has the value of "0". This is the case ("yes"), so that in step 414 the master node transmits the probe command DIP0 and, if the slave node 130 answers, obtains a confirmation of the probe in step 416 (see "yes"), and transmits the enter command DIE0 in step 420.

As was already set forth above, in step 422 both the master node and the slave nodes reduce their indices. In step 424, the master node probes, as was already explained in FIG. 3, whether all of the bits have been probed, and returns to step 513, since only the most significant bit has been probed up to that point.

These steps are repeated accordingly for the next index 2 (see id[2] in FIG. 2).

Further, the third bit, or the position uid[1], has the value of "1", so that the master node branches step 514 to step 428 and transmits a probe command DIP1. If the slave node 130 continues to respond, the third position will also be confirmed in step 430 (see "yes"), and the master node will transmit the enter signal DIE1 in step 434.

In step 422, both the master node and the slave nodes again reduce the indices. Since not all of the bits have been probed yet, step 424 branches back to step 513, and the path for probing the value of "0" is passed through at the last bit position (uid[0], see FIG. 2). In case of a successful run, i.e. in the case of confirmation by the slave node 130, all of the bits have been probed (see step 424), and the search is successfully completed in step 436. Thus, the search results in that a node having the reference ID "0010" continues to be connected to the single wire network, and it therefore continues to be stored in the ID memory of the master node.

Should the slave node fail, e.g., during this probing operation, the master node will obtain either no confirmation for the value of "0" (see step 416 and "no"), or no confirmation for the value of "1" (see step 430 and "no"), and will abort probing in step 538, or end it unsuccessfully in step 440. In this case, the master node may be configured to delete the reference ID, which was searched for without success, from the ID memory so as to store only positively validated IDs.

FIG. 5 shows a flowchart of an embodiment of searching for an ID of a slave node of a single-wire communication network, wherein the ID is known and is searched for by means of the combined enter probe commands DIxx already explained above.

As in the methods explained above, the method starts with steps 402 to 412, i.e. the master node transmits a start search command DISS, the indices are initialized, and the slave nodes are activated.

In step 613, the master node then gets the reference bit and the next reference bit, or, in other words, the next two reference bits.

Similarly to what was described in FIG. 4, a run will be described below by means of the search for the ID of the slave node 130 in accordance with FIG. 2. In this case, the master node gets the two most significant reference bits from the ID memory, namely id[3] and uid[2], or the corresponding valued of "0" and "0", so as to determine which of the four combined enter probe commands will be transmitted next.

In step 514, the master node probes whether the position defined by the current index, in this case uid[3], has the value of "0". This is the case ("yes"), so that in step 614 the master nodes probes whether the next position uid[2] also has the value of "0". This is the case ("yes"), so that in step 616 the master node transmits the combined enter probe command DI00.

In response to the combined enter probe command DI00, each of the slave nodes 130, 150, 170 probes, in accordance with the code for the DIE0 portion of the command DI00, whether the value at the position uid[3] defined by the index has the value of "0". This is the case for all of the 3 slave nodes, so that all of the 3 slave nodes remain active. In addition, all of the three slave nodes, just like the master node in step 422, decrement their indices by one to the value of 2. Subsequently, the slave nodes probe, without the master node transmitting a further command, the DIP0 portion of the command DI00 (see code), and the slave node 130 transmits the interrupt signal IRQ to the master.

In step 424, a return is made to step 613, since not all of the bits have been probed yet. The value of "0", which is defined by the current index 2, is read out from the ID memory uid[2], and additionally the value of "1" defined by the index 1, which index is next with regard to the search direction, is read out from the ID memory uid[1].

Accordingly, the probing in step 514 to see whether the current bit has the value of "0" will yield the result "yes" and, in step 614, the probing to see whether the next bit has the value of "0" will yield the result "no", so that the master node transmits the combined command DI01 in step 618.

In response to the combined enter probe command DI01, each of the slave nodes 130, 150, 170 probes, in accordance with the code for the DIE0 portion of the command DI01, whether the value at the position uid[2] defined by the index has the value of "0". This is the case only for slave nodes 130, so that only the slave node 130 remains active. In addition, all of the three slave nodes, just like the master node in step 424, decrement their indices by one to the value of 1. Subsequently, the slave nodes probe, without the master node transmitting a further command, the DIP1 portion of the command DI01 (see code), and the slave node 130 transmits the interrupt signal IRQ to the master node.

In step 424, a return is made to step 613, since not all of the bits have been probed yet. The value of "1", which is defined by the current index 1, is read out from the ID memory uid[1], and additionally the value of "0" defined by the index 0, which index is next with regard to the search direction, is read out from the ID memory uid[0].

Accordingly, the probing in step 514 to see whether the current bit has the value of "0" will yield the result "no" and, in step 620, the probing to see whether the next bit has the value of "0" will yield the result "yes", so that the master node transmits the combined command DI10 in step 622.

In response to the combined enter probe command DI10, each of the slave nodes 130, 150, 170 probes, in accordance with the code for the DIE0 portion of the command DI10, whether the value at the position uid[1] defined by the index has the value of "0" and whether the index is 0. Since the index is not decremented until after the comparison, the index will still be larger than 0, and since the slave node has the value of "1" at the index position 1, the slave node 130 remains active. In addition, all of the three slave nodes, just like the master node in step 424, decrement their indices by one to the value of 0. Subsequently, the slave nodes probe, without the master node transmitting a further command, the DIP0 portion of the command DI10 (see code), and the slave node 130 transmits the interrupt signal IRQ to the master node.

In some embodiments, the search run may be successfully completed at this point already, since entering the last path is not necessary for the search for or verification of the reference ID on account of the probing of the last position (see FIG. 5). In this case, step 424 may comprise comparing the index with the value of 0 and successfully completing the search in step 436 if the index has the value of 0, as is the case here.

In an alternative embodiment, the enter command may be performed, and step 424 may comprise, in a subsequent run, probing whether the index is smaller than the value of 0, and successfully completing the search in step 436 if the index is smaller than the value of 0.

Even though embodiments previously have been described which have IDs comprising four digits, embodiments may be employed for IDs of any length N, or device_id_length, it being possible for each of the digits to have a multitude M of different values. With a binary ID word with M=2, each of the digits, or positions, may have the value of "0" or "1".

Even though embodiments previously have been described which have IDs whose positions comprise binary values, embodiments may comprise any other values, e.g. decimal or hexadecimal values. Embodiments comprising decimal values, for example, have a program code which differentiates between said 10 values, i.e., e.g., ten different probe commands and enter commands, one for each value, and which is adapted accordingly.

In this context, the slave nodes are configured, for example, as with the program code for the binary embodiment, to probe, for the respective DIPx command, whether their own value matches, at that position of their own ID which is defined by the index, the value which is to be probed and is defined as "x" by the DIPx.

In contrast to the program code for the binary embodiment, the slave nodes are configured, for example, to probe, for the respective DIEx command, whether their own value matches, at that position of their own ID which is defined by the index, the value which is to be entered and is defined as "x" by the DIEx; by analogy with the binary embodiment, the slave nodes to which this applies remain active, whereas the other slave nodes are deactivated.

In embodiments comprising more than two values per position, a decimal or hexadecimal search tree, for example, will result accordingly, which comprises, accordingly, ten or 16 paths per node which may be probed for the search. Accordingly, similarly to the embodiments concerning the binary examples, a plurality of actual or potential branching nodes and paths per branching node may result which are then stored in accordance with the second or fourth embodiment.

Even though embodiments have been described previously wherein indexing starts from the least significant position or bit with the index 0, other embodiments may also comprise other indexings, for example starting with the index 0 for the most significant position or bit, or they may comprise a search sequence proceeding from the least significant position to the most significant position.

Further embodiments will be described below, by way of example, for binary IDs, however without limiting them thereto or limiting them to said specific examples of the commands.

In view of the above explanations, embodiments of the method may provide a method of searching for an ID uid or partial ID of a slave node 130, 150, 170; 130', 150', 170' within a single-wire communication network 100, the single-wire communication network comprising a master node 110 and one or several slave nodes 130, 150, 170 connected to one another via a single-wire connection 102, each slave node comprising a memory having a multi-digit ID uid stored therein which enables unambiguous identification of the slave node within the single-wire communication network, each digit having a predetermined value; the method further comprising:

defining 412, 422 a position of the ID uid or partial ID by means of an index idptr in the master node and in the slave node or in one of the several slave nodes;

transmitting 414 a first probe command DIP0 from the master node to the slave node or to the several slave nodes, the first probe command defining, at that position of the ID uid or partial ID which is defined by the index idptr, a first value "0" to be probed;

comparing the first value "0" to be probed with a value uid [idptr] at that position of a dedicated ID uid or partial ID which is defined by the index idptr, in the slave node or in the several slave nodes;

transmitting an interrupt signal IRQ from the slave node or one 130, 130' of the several slave nodes when the comparison results in that the first value "0" to be probed equals the value uid[idptr] at that position of the dedicated ID or partial ID which is defined by the index, and that the slave node or the one 130, 130' of the several slave nodes comprises an active status active=True;

transmitting 420 an enter command DIE0 from the master node to the slave node or the several slave nodes when the master node receives the interrupt signal IRQ (416 in combination with "yes"), the enter command defining, at that position of the ID uid or partial ID which is defined by the index idptr, a value "0" to be entered;

comparing the value "0" to be entered with a value uid[idptr] at that position of the dedicated ID uid or partial ID which is defined by the index idptr, in the slave node or in the several slave nodes;

changing a dedicated status of the slave node or a dedicated status of one 130, 130' of the several slave nodes from an active status to an inactive status (active=False) when the comparison results in that the value "0" to be entered does not equal the value uid[idptr] at that position of the dedicated ID or partial ID which is defined by the index; and changing 422 the index idptr by one position in a search direction in the master node and the slave node or the several slave nodes, when the enter command DIE0 is transmitted or received.

Embodiments may further be configured such that the method starts with the following steps:

transmitting a start search command DISS on the part of the master node to the slave node or the several slave nodes;

setting the slave or the several slave nodes to the active status (active=True); and initializing 412 the index in the master node and the slave node or the several slave nodes so as to define, by means of the index, a starting position of the ID or partial ID from which the search starts.

Embodiments may further be configured to comprise the following steps:

transmitting a second probe command DIP1 from the master node at the same, or unchanged, index, the second probe command defining a second value "1" to be probed, which differs from the first value to be probed, and the second probe command being transmitted after the first probe command DIP0 and before the enter command DIE0; and transmitting the interrupt signal IRQ on the part of the slave node or one of the several slave nodes when the comparison results in that the second value "1" to be probed equals the value uid[idptr] at that position of the dedicated ID or partial ID which is defined by the index, and that the slave node or the one 130, 130' of the several slave nodes comprises an active status (active=True).

Embodiments may further be configured such that a second probe command DIP1 is transmitted by the master node only when the master node has received no interrupt signal IRQ upon the first probe command DIP0 that was transmitted previously.

Embodiments may further be configured such that the enter command DIE0 defines a first value "0" to be entered which matches the first value "0" to be probed of the previously transmitted first probe command DIP0, when the master node has received the interrupt signal IRQ upon the first probe command DIP0 that was transmitted previously.

Embodiments may further be configured such that a second probe command DIP0 is usually transmitted by the master node.

Embodiments may further be configured such that the enter command DIE0 defines a first value "0" to be entered which matches the first value "0" to be probed of a previously transmitted first probe command DIP0, when the master node has received the interrupt signal IRQ upon the first probe command DIP0, and wherein the enter command DIE1 defines a second value "1" to be probed which matches a second value "1" to be probed of the previously transmitted second probe command DIP1, when the master node has received no interrupt signal upon the previously transmitted first probe command DIP0 and has received an interrupt signal IRQ upon the previously transmitted second probe command DIP1.

Embodiments may further be configured such that instead of the enter command DIE0, DIE1, a combined enter probe command DIxx is transmitted by the master node to the slave node or to the several slave nodes when the master node receives the interrupt signal IRQ upon a previously transmitted first or second probe command, the combined enter probe command having the effect of an enter command DIE0, DIE1 and of a subsequent first or second probe command DIP0, DIP1.

Embodiments may further be configured such that a first combined enter probe command DI00 or a second combined enter probe command DI01 is transmitted when the master node receives the interrupt signal IRQ upon the previously transmitted first probe command DIP0, the first combined enter probe command DI00 having the effect of an enter command DIE0, which defines a first value "0" to be entered, and of a subsequent first probe command DIP0, DIP1, and wherein the second combined enter probe command DI01 has the effect of the enter command DIE0, which defines a first value "0" to be entered, and of a subsequent second probe command DIP1.

Embodiments may further be configured such that a third combined enter probe command DI10 or a fourth combined enter probe command DI11 is transmitted when the master node receives the interrupt signal IRQ upon the previously transmitted second probe command DIP1, the third combined enter probe command DI10 having the effect of the enter command DIE1, which defines a second value "1" to be entered, and of a subsequent first probe command DIP0, DIP1, and the fourth combined enter probe command DI11 having the effect of the enter command DIE1, which defines a second value "1" to be entered, and of a subsequent second probe command DIP1.

Embodiments may further comprise the following steps:
transmitting a memory command DIMM to the slave node or the several slave nodes on the part of the master node when the master node has received an interrupt signal IRQ upon the first probe command DIP0 and has transmitted no second probe command DIP1 at the same index, and the index thus defines a potential branching position, or when the master node has received an interrupt signal IRQ upon the first probe command DIP0 and the second probe command DIP1, and the index thus defines an actual branching position, so as to be able to perform, upon completion of the search, a further search from the potential or the actual branching position;
storing idptr_mem the index idptr on the part of the master node and the slave node or the several slave nodes when the memory command is transmitted or received; and
storing active_mem the dedicated status active on the part of the slave node or the several slave nodes when the memory command is received.

Embodiments may further comprise the following steps:
transmitting a recall command DIRC to the slave node or the several slave nodes on the part of the master node when the search or a search run has been completed, e.g. when the last position of the ID in accordance with the search order has been reached (idptr<0);
setting the index idptr to the stored index idptr_mem on the part of the master node and the slave node or the several slave nodes; and
setting the status active to the stored status active_mem on the part of the slave node or the several slave nodes.

Embodiments may further be configured such that the index and the respective status of a branching position, which is the last potential or actual one with regard to the search direction, are stored by means of the storage memory DIMM and recalled by means of the recall command DIRC.

Embodiments may further be configured such that several indices and corresponding dedicated statuses of potential or actual branching positions are stored, in the order of the search direction, by means of several memory commands DIMM, and are recalled, in the direction opposite to the search direction, by means of several recall commands (DIRC).

In alternative embodiments, the first probe command may also be the command DIP1, and the first value to be probed may be the value "1", and, accordingly, the second probe command may be the command DIP0, and the second value to be probed may be the value "0". The same applies to the enter command DIEx, and to the value to be probed, and to the combined enter probe commands DIxx.

In summary, it may further be stated that embodiments enable that the master node may find the slave nodes with the probing support or by means of the probe commands DIPx, which enables the master node, in turn, to pass through the binary search tree within one run with or without knowledge of the slave ID searched for.

The master node may store the index at any time during the search run, and may return, during the search, to the stored nodes or branching positions of the search tree. In addition, the master node may use the index storage function for grouping a group of different slave nodes, i.e. for grouping the slave nodes having the same product ID. The bit length of the ID may simply be adapted to the requirements desired, since extending the bit length does not lead to an exponential increase, but only to a linear increase in the searching time. In addition, mixed ID lengths may be supported by means of the command DILC.

In addition, by means of the combined enter probe commands DIxx, the search is made possible while using a minimum number of commands.

Also, embodiments are characterized in that they take an advance look at the next node of the search tree by means of the probing method or the searching algorithm, so as to achieve maximum efficiency.

Furthermore, the second and fourth embodiments are characterized in that an index ID and an activity status may be stored at any time during the search, and that the stored location or node may be called up again or restored at desired points in time with the respective activity status stored.

Embodiments are not limited to the binary search but may comprise any number of values for each position, for example values in accordance with the decimal or hexadecimal systems.

Alternative embodiments enable searching for one, several or all of the IDs of the slave nodes connected to the communication network.

Further alternative embodiments of the method, of the master node and/or of the slave node perform the various steps in accordance with the previously described sequence or in any other sequence; for example, several DIEx commands may be transmitted one after the other if parts of the ID or the entire ID are/is known.

Alternative embodiments may be configured, for searching for a partial ID, to not complete the search as late as after the previously described end criterion, e.g. idptr<0 for a full ID, but, for example, in accordance with another end criterion, e.g. idptr<2, if a search in the previously described example having an ID length of N=4, is to be ended after the first two positions, i.e. if the partial ID to be searched for, or the search branch, comprises the first 2 positions.

In addition, embodiments may be configured to be used within a communication network having slave nodes of different ID lengths, i.e. a different number of positions N or device_id_length, and to probe whether a slave node having a smaller ID length than an ID length that may be searched for by the master node is connected to the communication network, or whether its shorter ID has been found.

If the communication networks comprises, e.g., a slave node having N1=4 positions and a second slave node having N2=6 positions, the first slave node having the first ID uid1 will set its index idptr1 to idptr1=3 at the beginning of the search, and both the second slave node comprising the second ID uid2 and the master node will set their indices idptr2 to idptr2=5. Irrespective of the different indices, in accordance with the embodiments illustrated above, which start the search with the most significant position of the ID and end it with the least significant position, idptr1=3 and idptr2=5 both define the most significant admissible position of the respective ID, idptr1=2 and idptr2=4 both define the second highest admissible position of the respective ID, idptr1=1 and idptr2=3 both define the third highest admissible position of the respective ID, and idptr1=0 and idptr2=2 both define the fourth highest admissible position of the respective ID, the fourth highest position for the first slave node at the same time also being the least significant admissible and smallest admissible position. Further reduction of the indices on account of a further enter command DIEx results in that idptr1="−1", i.e. is smaller than the smallest index admissible for the first slave node, i.e. "0". For example, if the first slave node has the ID "0010" (see slave node 130 in FIG. 2), if the second slave node has the ID "011100", and if the master node has taken the search path "0010", the second slave node will have been inactive since the second enter command DIE0 224 (see FIG. 2), and the first slave node will also be inactive after receiving the fourth enter command DIE0 244 (see FIG. 2). The master node is then configured, for example, to transmit the first probe command DIP0 and the second probe command at an unchanged index idptr2=1, so as to probe whether there is a slave node that has the ID or partial ID "0010x". In this case, however, there is no slave node having said partial ID, and the master node obtains no interrupt signal IRQ for either of the two probe commands. The master node is then configured, for example, to transmit a length check command DILC, and to probe, in this manner, whether there is a slave node having an ID length N=4. Upon receipt of the length check command, the first slave node probes whether the index is smaller than the smallest admissible index "0" (see exemplary code for slave node(s) for the command DILC: idptr<0). This is the case. The first slave node transmits the interrupt signal IRQ. Thus, the master node recognizes that an ID "0010" of the slave node 130, 130' having the shorter ID, i.e. the ID length N=4, has been found.

Therefore, embodiments of the master node may be configured to recognize that a slave node having a shorter ID length has been found, and to end, e.g., a search run and to store the ID if the master node has obtained no interrupt signal in response to all kinds of probe commands DIPx, but obtains an interrupt signal in response to a length search command. In the binary search, two values and, thus, two different probe commands DIP0, DIP1 are possible, in the hexadecimal search, 16 different values are possible, and thus 16 different probe commands DIP"0" to DIP"15" are possible.

In other words, embodiments of the method or of the master node may be further configured to search for an ID having a first number N1=6 of positions, the slave node or one of the several slave nodes comprising an ID having a second number N2=4 of positions which is smaller than the first number of positions, a largest admissible index "3" defining a most significant position uid[3], and a smallest admissible index "0" defining a least significant position uid[0] of the ID uid of the slave node or of the one of the several slave nodes, and the master node recognizing that the ID of the slave node or of the one of the several slave nodes has been found, when the master node has transmitted all kinds of probe commands DIPx at the same index and has not received the interrupt signal IRQ in response to any of the probe commands, and obtains the interrupt signal IRQ from the slave node or the one of the slave nodes after transmitting the length check command DILC. Embodiments of the slave node may be configured to transmit the interrupt signal IRQ if a probing, e.g. idptr1<0, initiated by the receipt of the length check command DILC, of the index idptr1 yields that the index is larger than the most significant admissible index "3" or smaller than the least significant admissible index "0" of the ID of the slave node. In the above-described case, the index "−1" is smaller than the smallest admissible index "0". In other words, the index "−1" is no admissible index. Thus, the first slave node transmits the interrupt signal.

Embodiments of the method, of the master node and of the slave node perform the search for the ID or partial ID of a slave node in a temporally successive manner and position by position, i.e. they perform it in a serial manner, and they are therefore suited, in particular, for single-wire communication networks which comprise only one wire 102 for communicating both the commands, e.g. DIPx, DIEx, and the interrupt signals IRQ or other data, and which do not comprise, e.g., several wires for parallel communication of several positions of the ID or partial ID.

In addition, embodiments may be applied both for software and for hardware.

Depending on the circumstances, the embodiments of the inventive methods may be implemented in hardware or in software. Implementation may be on a digital storage medium, in particular a disk, CD or DVD with electronically readable control signals which interact with a programmable computer system such that one of the embodiments of the inventive methods is performed. Generally, various embodiments of the present invention may include software program products, or computer program products, or program products, with a program code, stored on a machine-readable carrier, for performing one of the embodiments of the inventive methods, when one of the software program products runs on a computer or a processor. In other words, an embodiment of the present invention may thus be realized as a computer program, or software program, or program, stored on a computer-readable storage medium, and including computer-executable instructions (program code) for performing an embodiment of an inventive method, when the program runs on a processor.

While aspects of the invention have been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method, comprising:
defining a position of an ID or partial ID by means of an index in a master node and a slave node, the master and slave nodes being coupled together within a communication network, each slave node comprising a non-transitory computer-readable medium having a multi-digit ID stored therein which enables unambiguous identification of the slave node within the communication network, each digit of the multi-digit ID exhibiting a predetermined value;
transmitting a first probe command from the master node to the slave node, the first probe command defining, at that position of the ID or partial ID that is defined by the index, a first value "0" to be probed;
comparing the first value "0" to be probed with a value at that position of a dedicated ID or partial ID that is defined by the index, in the slave node;
transmitting an interrupt signal from the slave node responsive to the comparison resulting in that the first value "0" to be probed equals the value at that position of the dedicated ID or partial ID that is defined by the index, and that the slave node comprises an active status;
if the master node receives the interrupt signal, then transmitting a first enter command from the master node to the slave node, the first enter command defining, at that position of the ID or partial ID which is defined by the index, a value "0" to be entered;
if the master node does not receive the interrupt signal, then transmitting a second enter command from the master node to the slave node, the second enter command defining, at that position of the ID or partial ID that is defined by the index, a value "1" to be entered;
comparing the value defined by the first or second enter command with a value at that position of the dedicated ID or partial ID which is defined by the index, in the slave node;
changing a dedicated status of the slave node from the active status to an inactive status responsive to the comparison resulting in that the value defined by the first or second enter command does not equal the value at that position of the dedicated ID or partial ID that is defined by the index;
changing the index by one position in a search direction in the master node and the slave node, responsive to the first or second enter command; and
transmitting by the master node a second probe command, wherein the first enter command defines a first value "0" to be entered that matches the first value "0" to be probed of a previously transmitted first probe command, if the master node has received the interrupt signal upon the first probe command, and wherein the second enter command defines a second value "1" to be probed entered that matches a second value "1" to be probed of the previously transmitted second probe command, if the master node has received no interrupt signal upon the previously transmitted first probe command and has received an interrupt signal upon the previously transmitted second probe command.

2. The method of claim 1, wherein the communication network is a single-wire communication network including a wire as a communication connection, and the master node and the slave node are connected to one another via the wire.

3. The method of claim 1, further comprising:
transmitting, by the master node, a start search command to the slave node;
setting the slave node to the active status; and
initializing the index in the master node and the slave node so as to define, by means of the index, a starting position of the ID or partial ID from which the search starts.

4. The method of claim 1, further comprising:
transmitting a second probe command from the master node, the second probe command defining a second value "1" to be probed, and the second probe command being transmitted after the first probe command and before the first or second enter command; and
transmitting, by the slave node, the interrupt signal on the part of the slave node responsive to the comparison resulting in that the second value "1" to be probed equals the value at that position of the dedicated ID or partial ID that is defined by the index, and that the slave node is set to the active status.

5. The method of claim 1, wherein a second probe command is transmitted by the master node only if the master node has received no interrupt signal upon the first probe command that was transmitted previously.

6. The method of claim 1, wherein the first or second enter command defines a first value "0" to be entered that matches the first value "0" to be probed of the previously transmitted first probe command, if the master node has received the interrupt signal upon the first probe command that was transmitted previously.

7. A method, comprising:
defining a position of an ID or partial ID by means of an index in a master node and a slave node, the master and slave nodes being coupled together within a communication network, each slave node comprising a non-transitory computer-readable medium having a multi-digit ID stored therein which enables unambiguous identification of the slave node within the communication network, each digit of the multi-digit ID exhibiting a predetermined value;
transmitting a first probe command from the master node to the slave node, the first probe command defining, at that position of the ID or partial ID that is defined by the index, a first value "0" to be probed;
comparing the first value "0" to be probed with a value at that position of a dedicated ID or partial ID that is defined by the index, in the slave node;
transmitting an interrupt signal from the slave node responsive to the comparison resulting in that the first value "0" to be probed equals the value at that position of the dedicated ID or partial ID that is defined by the index, and that the slave node comprises an active status;
if the master node receives the interrupt signal, then transmitting a first combined enter probe command from the master node to the slave node, the first combined enter probe command comprising a first enter command and a further probe command, the first enter command defining, at that position of the ID or partial ID that is defined by the index, a value "0" to be entered;
if the master node does not receive the interrupt signal, then transmitting a second combined enter probe command from the master node to the slave node, the second combined enter probe command comprising a second enter command and a further probe command, the second enter command defining, at that position of the ID or partial ID that is defined by the index, a value "1" to be entered;

comparing the value defined by the first or second enter command with a value at that position of the dedicated ID or partial ID which is defined by the index, in the slave node;

changing a dedicated status of the slave node from the active status to an inactive status responsive to the comparison resulting in that the value defined by the first or second enter command does not equal the value at that position of the dedicated ID or partial ID that is defined by the index; and changing the index by one position in a search direction in the master node and the slave node, responsive to the first or second enter command.

8. The method of claim 1, further comprising:
transmitting, by the master node, a memory command to the slave node if the master node has received an interrupt signal upon the first probe command and has transmitted no second probe command at the same index, such that the index defines a potential branching position, or if the master node has received an interrupt signal upon the first probe command and the second probe command, such that the index defines an actual branching position, so as to be able to perform, upon completion of the search, a further search from the potential or the actual branching position;

storing, by the master node and the slave node, the index responsive to the memory command; and storing, by the slave node, the dedicated status if the memory command is received.

9. The method of claim 8, comprising:
transmitting, by the master node, a recall command to the slave node if the search for the ID or partial ID has been completed;

setting, by the master node and the slave node, the index to the stored index; and setting, by the slave node, the status to the stored status.

10. The method of claim 8, wherein the index and the respective status of a branching position, which is a last potential or actual one with regard to the search direction, are stored in the non-transitory computer-readable medium and recalled from the non-transitory computer-readable medium responsive to a recall command.

11. The method of claim 8, wherein several indices and corresponding dedicated statuses of potential or actual branching positions are stored, in the order of the search direction, using several memory commands, and are recalled, in the direction opposite to the search direction, using several recall commands.

12. The method of claim 1, wherein the master node is configured to search for an ID with a first number of positions, and the slave node comprises an ID with a second number of positions, which is smaller than the first number of positions, a maximum admissible index defining a most significant position, and a minimum admissible index defining a least significant position, of the ID of the slave node, the method further comprising:

recognizing, by the master node, that the ID of the slave node has been found when the master node has transmitted all of the probe commands at the same index and has not received the interrupt signal in response to any of the probe commands, and receives the interrupt signal from the slave node after transmitting a length check command.

13. A master node for a communication network, wherein the communication network comprises a communication connection, a master node, and one or more slave nodes, all interconnected via the communication connection, each of the one or more slave nodes comprising a non-transitory computer-readable medium having a multi-digit ID stored therein that enables unambiguous identification of the slave node within the communication network, each digit comprising a predetermined value, the master node comprising:

a transmitter that is connectable to the communication connection; and a process unit coupled to the transmitter and configured to:
search for an ID or partial ID of one of the slave nodes,
define, for the search, a position of the ID using an index,
control the transmitter to transmit a first probe command defining, at that position of the ID or partial ID that is defined by the index, a first value "0" to be probed,
control the transmitter to:
transmit a first enter command defining, at that position of the ID or partial ID that is defined by the index, a value "0" to be entered, responsive to the master node receiving an interrupt signal,
transmit a second enter command defining, at that position of the ID or partial ID that is defined by the index, a value "1" to be entered, if the master node does not receive an interrupt signal, and change the index by one position in a search direction if the process unit controls the transmitter to transmit the enter command, and not change the index if the process unit controls the transmitter to transmit the first probe command, and transmitting by the master node a second probe command, wherein the first enter command defines a first value "0" to be entered that matches the first value "0" to be probed of a previously transmitted first probe command, if the master node has received the interrupt signal upon the first probe command, and wherein the second enter command defines a second value "1" to be probed entered that matches a second value "1" to be probed of the previously transmitted second probe command, if the master node has received no interrupt signal upon the previously transmitted first probe command and has received an interrupt signal upon the previously transmitted second probe command.

14. The master node of claim 13, wherein the communication network is a single-wire communication network comprising a wire as the communication connection, and the transmitter of the master node is connectable to the wire.

* * * * *